United States Patent
Vassilovski et al.

(10) Patent No.: US 6,990,119 B2
(45) Date of Patent: Jan. 24, 2006

(54) METHOD AND APPARATUS TO FACILITATE A TRANSPARENT SERVICE OPTION TRANSITION

(75) Inventors: Dan Vassilovski, Del Mar, CA (US); James Tomcik, Carlsbad, CA (US); Stephen Carter, Rancho Santa Fe, CA (US); Yu-Dong Yao, San Diego, CA (US); Maria Marshall, Oceanside, CA (US)

(73) Assignee: Qualcomm, Inc., San Diego, CA (US)

( * ) Notice: Subject to any disclaimer, the term of this patent is extended or adjusted under 35 U.S.C. 154(b) by 684 days.

(21) Appl. No.: 09/779,016

(22) Filed: Feb. 7, 2001

(65) Prior Publication Data

US 2002/0105939 A1 Aug. 8, 2002

(51) Int. Cl.
*H04J 15/00* (2006.01)

(52) U.S. Cl. .................. 370/464; 379/142.18; 380/270
(58) Field of Classification Search ................ 370/259, 370/271, 464; 379/142.01, 142.05, 142.14, 379/142.18, 171, 207.1, 207.11; 380/247, 380/249, 257, 270, 42; 713/200, 201

See application file for complete search history.

(56) References Cited

U.S. PATENT DOCUMENTS

| | | | | | |
|---|---|---|---|---|---|
| 4,167,700 | A | * | 9/1979 | Coe et al. | 380/33 |
| 5,335,276 | A | * | 8/1994 | Thompson et al. | 380/266 |
| 5,592,555 | A | * | 1/1997 | Stewart | 380/247 |
| 5,594,797 | A | * | 1/1997 | Alan ar a et al. | 380/28 |
| 5,594,798 | A | * | 1/1997 | Cox et al. | 380/257 |
| 5,818,937 | A | * | 10/1998 | Watson | 713/184 |
| 6,266,418 | B1 | * | 7/2001 | Carter et al. | 380/257 |
| 6,356,638 | B1 | * | 3/2002 | Hardy et al. | 380/275 |

* cited by examiner

*Primary Examiner*—Hassan Kizou
*Assistant Examiner*—Dmitry Levitan
(74) *Attorney, Agent, or Firm*—Phil Wadsworth; Sandip (Micky) S. Minhas; Abdollah Katbab (57) ABSTRACT

A method and apparatus for allowing a transparent service option transition between at least two wireless communication devices (WCDs). A first communication between a first WCD and a second WCD is established using a first service option. At some point during the first communication, a transition to a second service option, such as an asynchronous data service option, is initiated. At least one of the WCDs provides an identification code to the other WCD using a signaling protocol over the first service option. The first communication is then terminated. A second communication using the second service option is then initiated by one of the WCDs, resulting in a seamless transition to the second service option.

10 Claims, 9 Drawing Sheets

METHOD AND APPARATUS TO FACILITATE A TRANSPARENT SERVICE OPTION TRANSITION

BACKGROUND

1. Field

The present invention pertains generally to the field of telephonic communications, and more specifically to providing an efficient method and apparatus for allowing a transparent service option transition between at least two communication devices.

2. Background

The field of wireless communications comprises many applications including cordless telephones, pagers, terrestrial wireless communication systems, and satellite communication systems. The use of terrestrial communication systems have become commonplace as consumers worldwide enjoy the benefits of inexpensive mobile communications.

Cellular telephony has evolved over the years, starting with an analog modulation scheme commonly referred to as AMPS (Advanced Mobile Phone System). Introduced by AT&T in 1983, AMPS became the most widely deployed cellular system in the United States.

Digital modulation schemes soon followed. Examples of such modulation schemes include the Global System for Mobile communications (GSM), Time Division Multiple Access (TDMA), and Code Division Multiple Access (CDMA). Digital communication systems offer advantages over the AMPS system, including a higher degree of voice quality.

Along with digital telephones, wireless data communications have become increasingly important. With the success of the Internet, there has been a need to provide mobile users the ability to send and receive digital data communications. Today, the aforementioned digital communication systems offer various techniques for allowing data communications to take place. For example, it is now commonplace for wireless telephones to receive stock quotes, email, and news articles.

In an extension of data communications, techniques are now available for converting audio information, such as human speech, into data packets suitable for transmission over a data network, such as the Internet. The audio information may be converted into data packets and transmitted over the air using a data service offered by a wireless service provider. The data service is often in addition to standard voice service typically offered by service providers. This kind of voice-over-data service can be useful for such applications as providing encrypted voice service for the military, for example.

In a communication system that provides both voice and data services, it would be desirable to allow users to transition between voice communications and data communications while users are actively engaged in a communication. For example, it would be advantageous for two users engaged in a standard voice telephone call to transition to a data service option that supports a secure mode of voice or data communications.

SUMMARY

The present invention is directed to a method and apparatus to allow a transparent service option transition between at least two communication devices. The invention is applicable to any communication system employing two or more service options. Examples of service options include voice communications, asynchronous data communications, and packet data communications.

In one embodiment, a communication between two wireless communication devices is established using one of the available service options, for example, voice communications. At some time during this initial communication, one or both parties involved in the communication desires to continue the initial communication in a service option other than the present service option. For example, at some point during a voice communication, one or both parties desire to switch from the current voice communication service option to an asynchronous data service option to utilize a secure mode of communications employing cryptographic techniques.

In one embodiment, one or both parties involved in the initial communication initiates a transition to the second service option by pressing a pre-designated key on the wireless communication device.

Pressing the pre-designated key activates a series of actions between the two communication devices. First, an information is exchanged between the two wireless communication devices. Then, the initial communication is terminated between the parties. Next, a second communication is established using the agreed-upon second service option initiated by one or the other party.

In one embodiment, during call initialization in the second service option, the non-initiating party receives initialization information from the initiating party. As part of the initialization process, the non-initiating party determines the identity of the initializing party by authenticating the initiating party by one of several techniques, such as using a caller ID function. The noninitializing party may chose to accept communications only from the initiating party based on the identity of the initiating party. This is to prevent a third party from initializing a communication with the non-initiating party before the initiating party has an opportunity to establish the second communication.

DETAILED DESCRIPTION

The embodiments described herein are described with respect to a wireless terrestrial communication system having at least two service options available to users. It should be understood that the embodiments described may be used in other communication systems as well, such as a satellite communication system or in a wireline communication system (for example a Public Switched Telephone Network). For example, the embodiments described herein could be used in a communications between a wireless telephone and a landline telephone, between a first wireless telephone and a second wireless telephone, or between two landline telephones.

Figure 1:
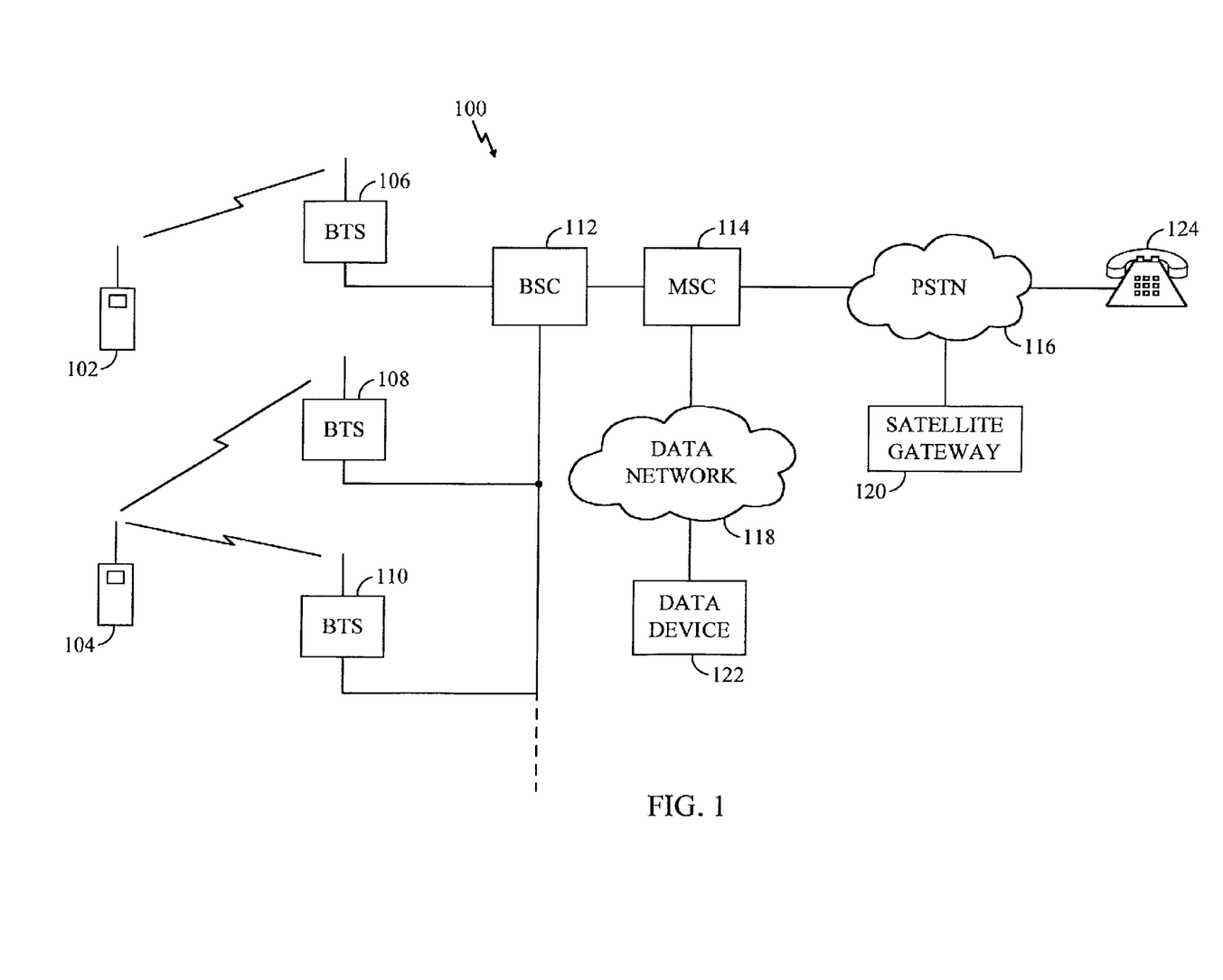
FIG. 1 illustrates a wireless terrestrial communication system in which various embodiments of the present invention are incorporated.

FIG. 1 illustrates a wireless terrestrial communication system 100 in which various embodiments of the present invention are incorporated. Wireless communication devices (WCDs) 102 and 104 communicate with basestation transceivers (BTSs) 106, 108, and/or 110 wirelessly using one or more well-known air-interfaces, such as code division multiple access (CDMA), time division multiple access (TDMA), global system for mobile communications (GSM), or others. WCDs 102 and 104 are shown in FIG. 1 comprising cellular telephones, although it should be understood that WCDs 102 and 104 could alternatively comprises a variety of electronic devices, such as a still camera, a video camera, a portable or fixed computer, a data collection device, a combination of the aforementioned, or other well-known electronic devices.

Communications from WCDs may be routed to devices outside communication system 100 (such as telephones or data modems) by way of mobile switching center (MSC) 114. MSC 114 routes communications to these other devices either through public switched telephone network (PSTN) 116 or through data network 118. Satellite gateway 120 is used to connect satellite devices, such as telephones or data modems, generally to PSTN 116. The information is subsequently received by data device 122 or modem 124, as the case may be.

Each of the devices describe above generally are capable of communicating in more than one mode of operation, for example, communicating in a voice mode and a data mode. Voice communications typically comprise transmitting human speech from one device to another, such as between a WCD to a landline telephone, or from a first WCD to a second WCD. Data communications generally comprise the transmission of data, including such applications as facsimile transmission, email, Internet access, audio and video streaming applications, and voice-over-data applications. Data communications today typically comprise one of two types: circuit-switched or packet-switched data communications.

Each of the just-mentioned communication modes are generally known as "service options" to those skilled in the art. Examples of service options include voice service options and data service options. Two data service options employed in cellular communications are defined in the Interim Standard IS-707A entitled "DATA SERVICE OPTIONS FOR WIDEBAND SPREAD SPECTRUM SYSTEMS, and include an asynchronous data service option, and a synchronous data service option. Other service options may alternatively be used in communication system 100.

The synchronous data service option defined in the Interim Standard IS-707A entitled "DATA SERVICE OPTIONS FOR WIDEBAND SPREAD SPECTRUM SYSTEMS is a packet-switched data service. In such packet data communications, information is formed into discreet units, or packets, each packet comprising information relating to a data address corresponding to a destination device to which the data packets are intended. One example of a data address is an Internet Protocol address, or IP address. A typical IP address comprises four fields, each field ranging from 0 to 255, uniquely identifying the destination device, which is connected to a data network such as the Internet. Data packets are transmitted over the data network, typically through a number of different paths, and may arrive in a different order than they were originally sent.

The asynchronous data service option defined in the Interim Standard IS-707A entitled "DATA SERVICE OPTIONS FOR WIDEBAND SPREAD SPECTRUM SYSTEMS is a circuit-switched data service. A common example of circuit-switched data communications is a facsimile machine transmitting information over the PSTN 116 to a second facsimile machine. The first facsimile machine establishes a dedicated connection over PSTN 116 with the second facsimile machine. Once the connection is established, data is exchanged between the facsimile machines over the dedicated circuit provided by PSTN 116. Note that in asynchronous communications, the transmitted information generally does not contain information identifying the destination device.

As explained above, WCDs 102 and 104 are capable of transmitting and receiving both voice and data communications. In one embodiment, data communications comprise encrypted voice communications. Encrypted voice communications may be used to prevent unauthorized listeners from intercepting and understanding telephone conversations. In this embodiment, audio information is digitized and encrypted, then the resulting information transmitted using one of the available data service options, including other data protocols in addition to asyncronous and syncronous data communications, described above.

Often, it becomes necessary to transition a communication initially using a first service option to a second service option. For example, a user of a first WCD may initiate a communication with a user of a second WCD using a voice service option normally used in wireless communication systems to transmit voice communications. At some point during the initial voice communication, one or both users may decide to continue the conversation in an encrypted mode of communications. In this embodiment, secure voice communications are available to the two users using an asynchronous data service. It would be desirable to transition the communication from the first service option (voice service option) to the second service option (asynchronous data service option) in a manner which is transparent to both users.

The present invention is directed to accomplishing a service option transition between two communication devices. Ideally, the method and apparatus for doing so is transparent to the users, i.e., the transition results in minimal interruption of the initial communication between the parties.

Figure 2:
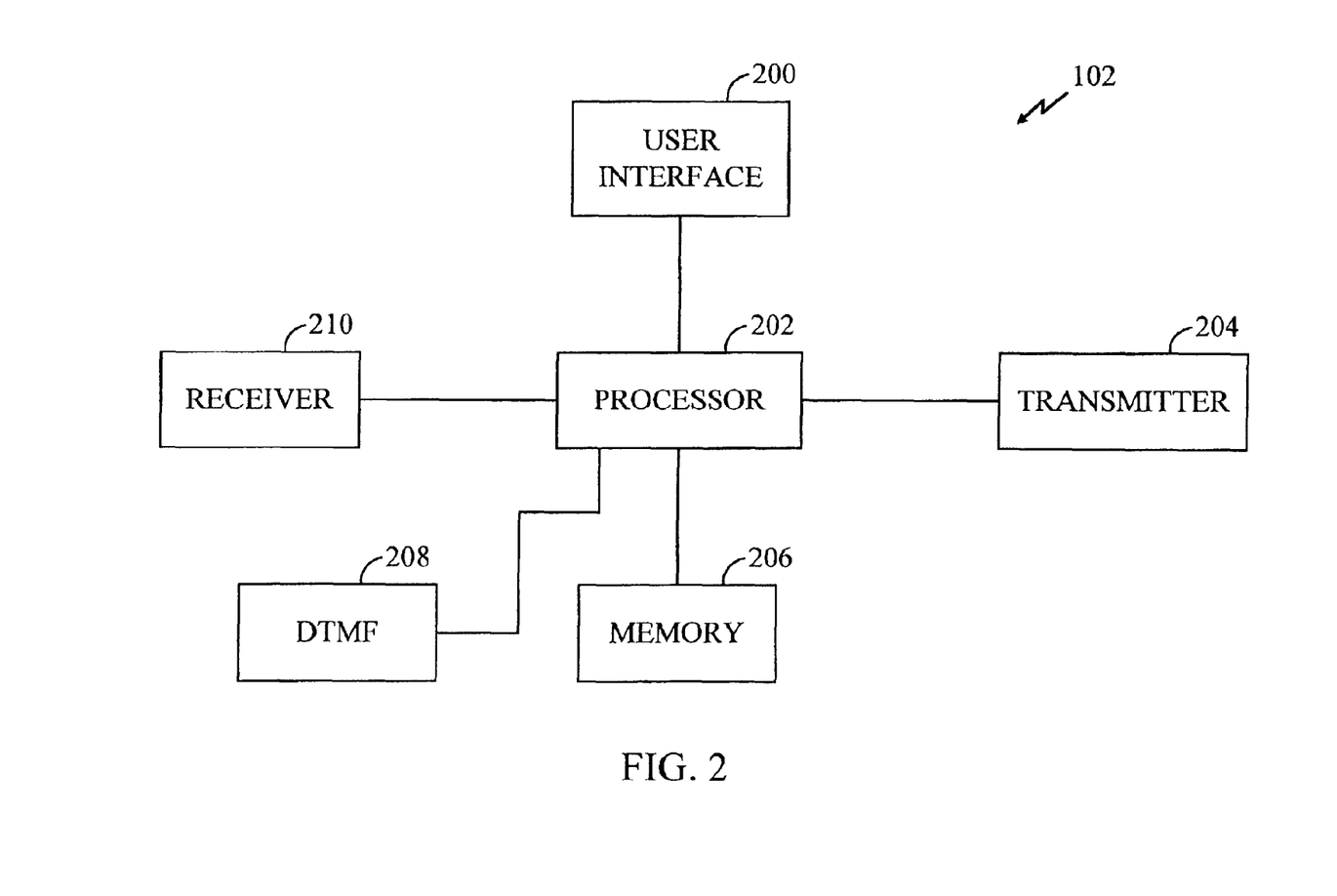
FIG. 2 illustrates a functional block diagram of a wireless communication device as used in one embodiment of the present invention.

FIG. 2 illustrates a functional block diagram of WCD 102 or WCD 104 as used in one embodiment of the present invention. Again, it should be understood that the components shown in FIG. 2 are not restricted to use in wireless communication devices but could be implemented in other devices, such as a landline telephone. In this embodiment, WCD 102 is a wireless telephone capable of communicating using more than one service option. Of course, WCD 102 could alternatively comprise a wireless or wireline modem used in conjunction with any number of electronic devices, such as a portable computer, a still camera, a video camera, or an electronic meter (such as a pressure meter, a power meter, a flow meter, etc.).

A user of WCD 102 may wish to communicate with another WCD, for example WCD 104 or modem 124, using a first service option, such as a voice service option. The various service options available to WCD 102 are dictated by a service provider of communication system 100. To initiate a communication, the user generally enters an identification code corresponding to WCD 104 into WCD 102 using user interface 200. Interface 200 typically comprises a keypad and display, although other interfaces could be used instead, such as a voice-activated interface, for example. The identification code typically comprises a telephone number, although any alpha-numeric combination which uniquely identifies WCD 104 could be used in the alternative. In addition, each WCD in communication system 100 could have a unique identification code for each service option supported by the communication system. For example, WCD 104 may be uniquely identified by a single telephone number during a voice service option and another telephone number for use in making an asynchronous data call using the asynchronous data service option. Or WCD 104 may be identified by a data address such as an Internet Protocol (IP) address.

In any case, after the user of WCD 102 initiates the communication to WCD 104, processor 202 generates any instructions necessary to establish a communication with WCD 104 using well-known techniques appropriate for communication system 100. Often, this involves sending one or more messages, sometimes known as an origination message, to one or more base station transceivers (BTSs) 106, 108, and/or 110. Such BTSs are well known in the art for sending and receiving communications between WCDs and a base station controller (BSC) 112, which is also well known in the art. In this example, it will be assumed that WCD 102 is in communication with BTS 106.

The origination message(s) instruct communication system 100 where to route the intended communication (in this case to WCD 104) by including the identification code corresponding to WCD 104. In another embodiment, each WCD is assigned one identification code for each service option supported by communication system 100. In this embodiment, the origination message includes the identification code corresponding to WCD 102 using the voice service option. In either case, the origination message also informs communication system 100 of the identity of the requesting WCD (in this case WCD 102), and furthermore the type of service option desired (in this case, the voice service option). Again, if WCD 102 has been assigned one identification code for each service option supported, then the origination message will include the identification code corresponding to WCD 102 using the voice service option. Additional information may be exchanged between communication system 100 and WCD 104 as well.

The origination message is received by BTS 106, and forwarded to BSC 112. From there, the request is generally forwarded to mobile switching center (MSC) 114. MSC 114 acts as a central point for call routing, and includes other functions essential to communication system 100, such as billing. In this case, an indication of the request to initiate communications is routed back to BSC 112, then to BTS 110 and transmitted to WCD 104, alerting WCD 104 that a voice service communication is available. The request to WCD 104 will generally comprise an identification of the requesting device, in this case WCD 102. Typically, this is provided by a caller identification function, or caller ID for short. Caller ID is a widely-used protocol for providing an identification of a requesting device (in this case WCD 102) to a receiving device (here, WCD 104). Of course, caller ID is not the only protocol that could be used to provide identification information. Any other technique known to those skilled in the art could be used in the alternative.

In any case, the request is received by WCD 104 and the request is accepted by a user of WCD 104 taking appropriate steps, such as depressing a key located on WCD 104. The two users may then initiate voice communications using the voice service option provided by communication system 100.

At some point during the conversation, one or both users may decide that they wish to continue the communication using an alternative communication service option, such as an asynchronous data service option offering either secure or "clear" voice transmissions, or a synchronous data service option offering either secure or "clear" data transmissions. The term "clear" is used to denote non-secure, or non-encrypted, communications.

In one embodiment where each WCD is assigned an identification code corresponding to each service option supported by communication system 100, WCD 102 may initiate communications with WCD 104 in the voice service option simply because WCD 102 does not know the identification code assigned to WCD 104 using the service option. In this case, WCD 102 may initiate communications using the voice service option and immediately begin the process of transitioning to the second service option without any actual voice communications between users.

Either user may initiate a transition of service option. For purposes of discussion, it is assumed that WCD 102 initiates the transition. The user of WCD 102 initiates the transition by entering a predetermined command into WCD 102 using user interface 200, for example pressing a pre-designated key for a predetermined time period. The type of service option to transition to may also be chosen by the user, be predetermined, or be negotiated between WCD 102 and WCD 104. Processor 202 receives the command and generates one or more messages for transmission to BTS 106 using transmitter 204.

In one embodiment, prior to processor 202 generating the necessary messages to begin the service option transition, processor 202 checks to determine if the user of WCD 102 has "logged on" to WCD 102 as a secure user prior to continuing the service option transition. In this embodiment, a unique passcode is pre-assigned to WCD 102 which must be provided by the user at some point prior to making or receiving a secure call. Processor 202 generally determines the passcode status by checking memory 206. An indication of a successful logon will be stored in memory 206 if the user has previously logged on.

If the user has not previously logged onto WCD 102, processor 202 prompts the user to enter the assigned passcode. Upon entry, processor 202 determines if the entered passcode matches the passcode assigned to WCD 202. This may be accomplished by accessing memory 206. Memory 206 comprises an electronic memory, well-known to those skilled in the art. Typically, memory 206 comprises a random access memory or a flash memory. Processor 202 compares the stored passcode to the passcode entered by the user. If a match is determined, processor 202 continues with the service option transition. Alternatively, the stored passcode could be kept in a memory remote from WCD 102, such as in BSC 112, MSC 114, or elsewhere, such as a Visitor Location Register (VLR) or a Home Location Register (HLR) (each not shown). VLRs and HLRs are well known in the art for supporting wireless communication systems. Each database (HLR or VLR) comprises information pertaining to the various WCDs operating within communication system 100 or roaming WCDs operating in other communication systems. In this embodiment, processor 202 generates an inquiry to the remote memory which stores the passcode information and transmits the inquiry using transmitter 204. Generally, a processor associated with the remote memory determines whether the passcode entered by the user matches the passcode stored in the remote memory. A message is transmitted to WCD 102 indicating the result. If a match was determined, processor 202 continues with the service option transition.

Processor 202 begins the service option transition by transmitting a transition message to WCD 104, requesting an identification code which uniquely identifies WCD 104. In another embodiment, the requested identification code comprises an identification code associated with WCD 104 for use in the second service option. In yet another embodiment, WCD 102 transmits an identification code which uniquely identifies WCD 102 for use in the second service option. Upon receipt of the transition message, WCD 104 generates and transmits the requested identification code. Again, in an embodiment in which each WCD is assigned a separate identification code for each service option, WCD 104 transmits the identification code associated with the second service option.

In one embodiment, the information transmitted between WCDs during this time (i.e., the transmission of the identification code(s)) is modulated by a dual-tone multi-frequency (DTMF) module 208 and transmitted in-band. In another embodiment, the DTMF tones are transmitted out-of-band. In addition, in another embodiment, the messages sent between WCDs used to transition the service (i.e., transition messages, acknowledgements, identification codes, etc.) are all transmitted using in-band DTMF signaling. Each user generally does not hear these tones. DTMF module 208 is responsible for modulating information from processor 202 into DTMF tones and also for demodulating DTMF tones received by receiver 210. It should be understood that the functionality of DTMF module 208 could alternatively be performed by processor 202 in conjunction with a series of executable computer instructions stored in memory 206. It should also be understood that the information transmitted between WCDs could alternatively be accomplished using a modulation scheme different than using in-band DTMF modulation, such as Frequency Shift Keying (FSK) or data signaling which is well known in the telecommunication art.

DTMF tones are generated at two specific frequencies, combined to form a tone that is very difficult to duplicate with the human voice. DTMF minimizes the possibility of inadvertent detection of voice as signaling, and can therefore be transmitted as an audio signal on the same channel as voice in a communication system 100. Standard WCDs are equipped with the capability to generate DTMF tones for a variety of signaling purposes such as voice mail and feature activation.

DTMF module 208 receives the identification code from processor 202 and converts the identification code into a series of DTMF tones, which are then transmitted in band. Similarly, a DTMF module converts WCD 104's identification code into DTMF tones which are transmitted to WCD 102 and received by receiver 210. The received DTMF tones are routed to DTMF module 208 and demodulated, producing a digital signal which is used by processor 202. Alternatively, information identifying each WCD could be stored within a memory, such as memory 206, so that DTMF module 208 does not have to rely on information supplied by processor 202 each time that a transition is desired.

WCD 102 receives the identification code from WCD 104 and stores it in memory 206. WCD 102 then terminates the initial voice communication. Generally, this involves generating a termination message from processor 202 and transmitting the message to BTS 106. The termination message is forwarded to BSC 112 and/or MSC 114 so that the initial communication may be terminated. This process is well known in the art. Generally, WCD 104 is made aware of the termination as well. In one embodiment, when the communication is terminated, WCD 104 initiates an elapsed timer for determining the amount of time elapsed from termination of the communication until a next communication is received.

Once the initial communication has been terminated, WCD 102 or WCD 104 initiates a second communication with the other WCD using a second service option, in this case, the asynchronous data service option. In another embodiment, the second communication is initiated by a predetermined protocol, such as the WCD that initiated the initial communication initiates the second communication. Other variations are, of course, possible. Assuming WCD 102 initiates the second communication, processor 202 generates one or more messages to initiate the communication. This information, collectively referred to as an origination message, generally comprises the identification code received from WCD 104 and stored in memory 206, used to inform BSC 112 and/or MSC 114 where to route the communication (i.e., WCD 104). In one embodiment, the origination message also comprises the identification code associated with WCD 102, either for use in the first service option or the second service option.

The origination message is received by BTS 106 and forwarded to BSC 112 and/or MSC 114. A message is generated by BTS 110 and transmitted to WCD 104 indicating the availability of a communication and an indication of which service option type the communication is embodied. The message may also comprise the identification code associated with WCD 102, or the identification code may be transmitted in a subsequent message.

In one embodiment, WCD 104 receives the message using receiver 210 and processor 202 determines if the identification code contained in the origination message matches the identification code that was transmitted by WCD 104 in the initial communication. If a match is found, WCD 104 accepts the communication using techniques well known in the art. In this case, an asynchronous communication between WCD 102 and WCD 104 results.

If a match is not found (indicating that another WCD is attempting communications with WCD 104), WCD 104 will only accept the communication if a predetermined time period has elapsed since termination of the previous communication with WCD 102. As mentioned earlier, WCD 104 uses an elapsed timer to determine if the predetermined time period has elapsed. If the predetermined time period has not elapsed, it indicates that WCD 104 is still waiting to be contacted by WCD 102 to complete the service option transition. Therefore, the elapsed timer is used to ensure continuity of communications between WCD 102 and WCD 104 during transition between the first communication using the first service option and the second communication using the second service option.

In another embodiment, the identification code associated with WCD 102 is ignored (or it is not contained within the origination message). In this case, WCD 104 simply accepts the communication using techniques well known in the art for completing a communication using the specified service option.

It should be understood that the features just described with respect to WCD 102 and WCD 104 are found in each device. That is, the processes of transmitting an identification code to the other WCD, terminating the initial communication, initiating the second communication using the second service option, receiving notification of the availability of the second communication, processing the identity of the WCD initiating the second communication, and accepting or rejecting the second communication are all found within a single WCD. Therefore, a number of different scenarios are possible.

In a first scenario, WCD 102 and WCD 104 are engaged in an initial communication using a first service option. WCD 102 initiates the service option transition by sending its identification code, terminating the initial communication, and initiating the second communication.

In a second scenario, WCD 102 and WCD 104 are engaged in an initial communication using a first service option. WCD 104 initiates the service option transition by sending its identification code, terminating the initial communication, and initiating the second communication.

In a third scenario, WCD 102 and WCD 104 are engaged in an initial communication using a first service option. Both WCD 102 and WCD 104 initiate the service option transition by sending their respective identification codes.

The three scenarios above could be modified by only one WCD transmitting a respective identification code. Only one identification code is needed for situations where an identification of the incoming communication is not needed (i.e., when an elapsed timer is not used). In another embodiment, no identification codes are transmitted if one of the WCDs already knows the identification of the other WCD. This will be discussed below.

Figure 3:
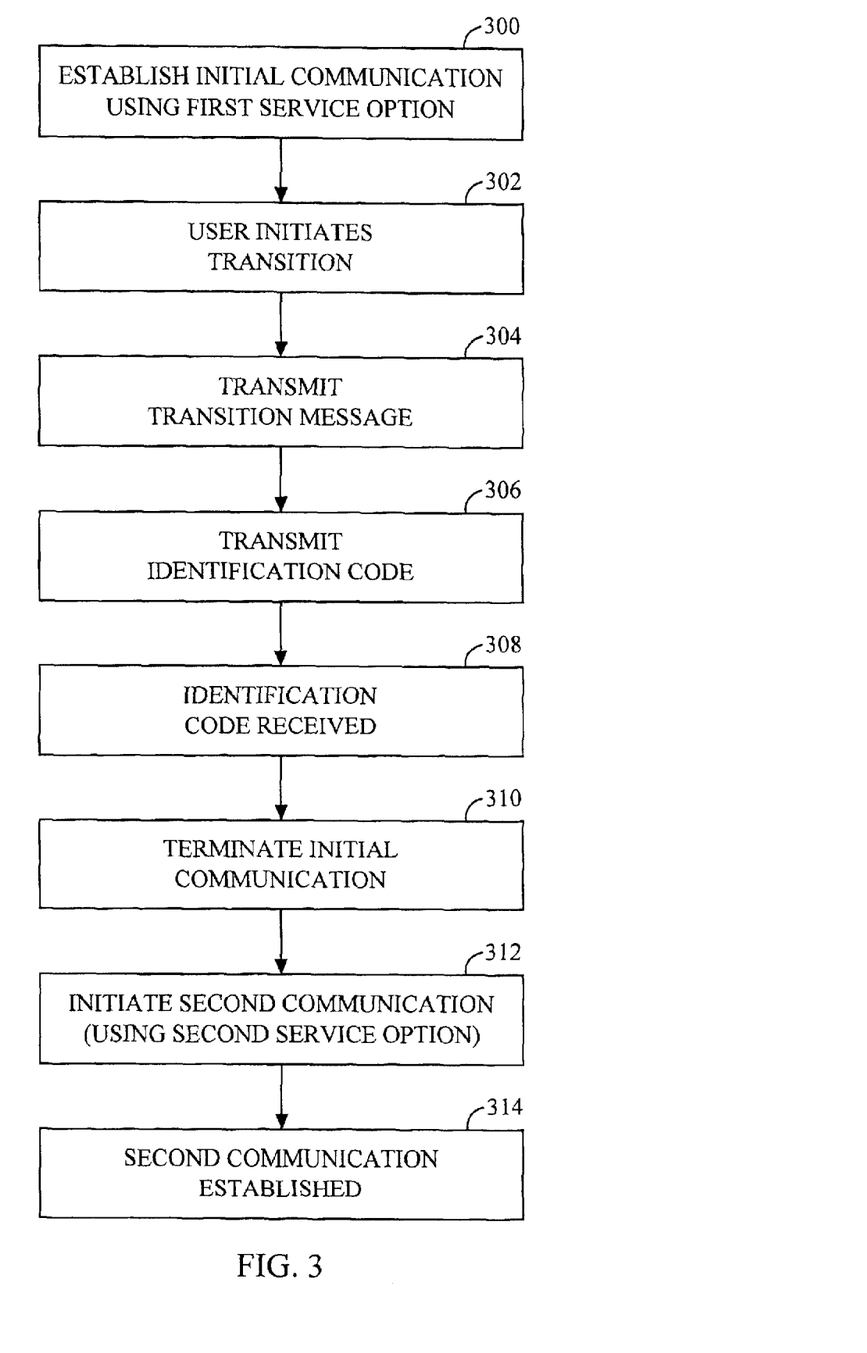
FIG. 3 illustrates a flow diagram illustrating one method for facilitating a transparent service option transition.

FIG. 3 illustrates one method for facilitating a transparent service option transition. In this example, WCD 102 initiates the actions necessary for the service option transition. It should be understood that either WCD 102 or WCD 104 could initiate this action.

Referring now to FIG. 3, an initial communication is established between WCD 102 and WCD 104 using a first service option in step 300. At a subsequent time, WCD 102 initiates a transition to a second service option, shown in step 302. Typically, this comprises a user of WCD 102 pressing a key on WCD 102.

In step 304, in response to the command to initiate a service option transition, processor 202 transmits a transition message to WCD 102. The transition message is received by WCD 104 and, in response, WCD 104 transmits its identification code to WCD 102, as shown in step 306. In step 308, the identification code corresponding to WCD 104 is received by WCD 102.

In step 310, WCD 102 terminates the initial communication by sending a termination message instructing BSC 112/MSC 114 to end the initial communication as is well known in the art. WCD 104 is generally notified of the termination.

In step 312, WCD 102 initiates a second communication using a second service option by transmitting one or more messages, known collectively as an origination message. The origination message specifies the type of service option desired, the identification code received from WCD 104 indicating where to route the second communication, and optionally, the identification code corresponding to WCD 102. In one embodiment, the second communication must generally commence prior to a predetermined time period from termination of the first communication.

WCD 104 is alerted to the availability of the second communication by BTS 106 using techniques well-known in the art and responds to the notification by BTS 106, thus establishing the second communication, as shown in step 314. In one embodiment, prior to accepting the communication, WCD 104 determines if the second communication has originated with WCD 102 by evaluating the identification code transmitted by WCD 102 along with the alert from BTS 106. If the identification code corresponds to another WCD other than WCD 102, the communication is rejected by WCD 102 if a predetermined time period from termination of the initial communication has not expired. If the identification code corresponds to WCD 102, then WCD 104 accepts the communication using techniques well known in the art.

Figure 4A:
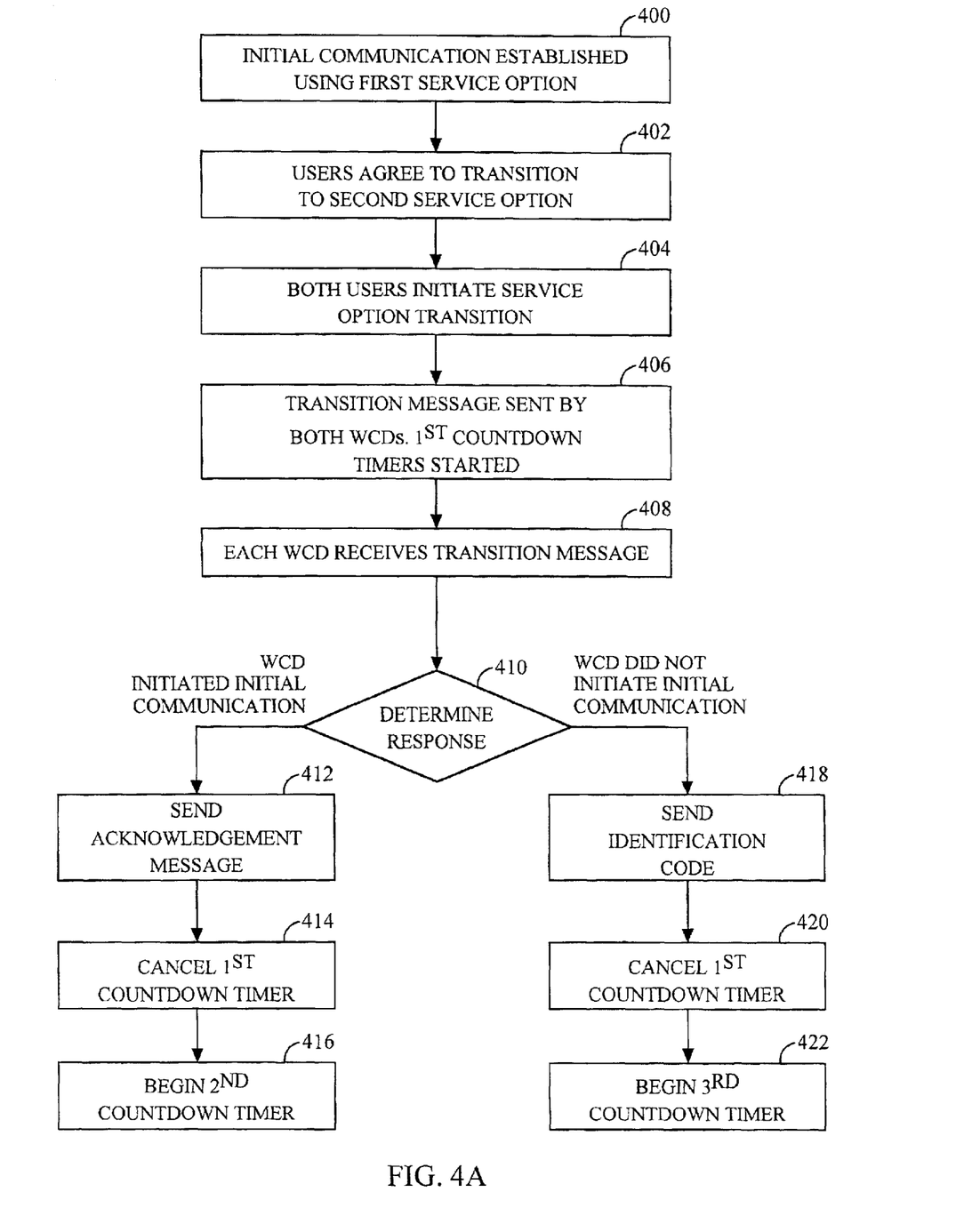
FIGS. 4a and 4b are flow diagrams illustrating a method for facilitating a transparent service option when two wireless communication devices initiate an action to transition to the second service option.
Figure 4B:
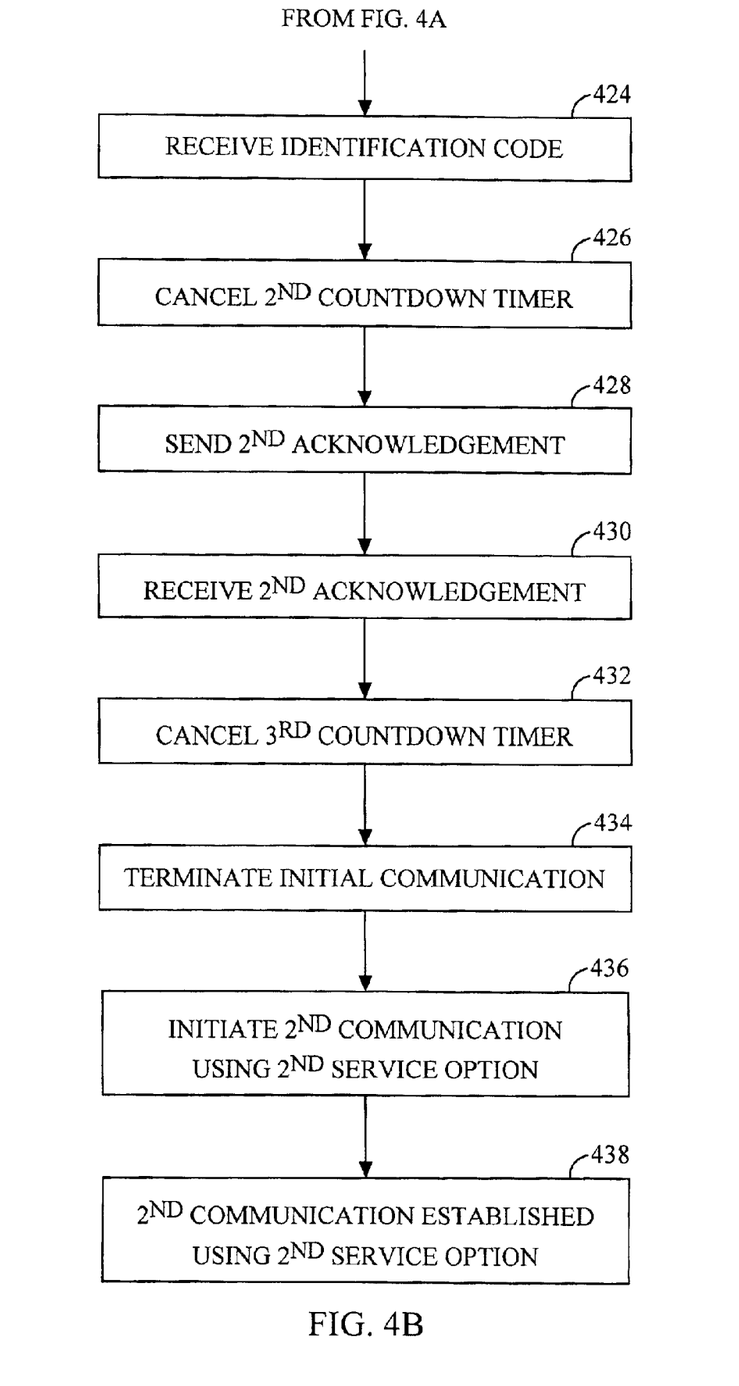

FIGS. 4a and 4b are flow diagrams illustrating a method for facilitating a transparent service option when both WCD's initiate an action to transition to the second service option. If not gracefully handled, the signaling that occurs would be processed by each WCD as unexpected and therefore cause erroneous messages between WCDs, causing the transition to fail.

In step 400, a communication between a first WCD and a second WCD using a first service option is initiated, the first WCD having initiated the communication, in this example. In addition, the first service option comprises a voice service option, although it should be understood that the first service option could alternatively comprise a synchronous data service option, an asynchronous data service option, or some other service option offered by the wireless service provider.

In step 402 the users of the first and second WCDs agree to transition the communication to a second service option, in this example, a secure data communication using an asynchronous data service option offered by the wireless service provider. In step 404, both users initiate the transition, generally by pressing a key located on their respective WCDs.

In step 406, a transition message is transmitted by each WCD in response to the command to initiate a service option transition. A first countdown timer is also started in each WCD. The first countdown timer is used to determine when the other WCD has responded to the transition message. If a return message is not received within a predetermined amount of time, an error is declared, and the user is notified generally via interface 200. The transition message informs the other WCD that a transition to a second, predetermined service option is desired. In another embodiment, the transition message additionally comprises information identifying the service option to transition to, or an identification code corresponding to the transmitting WCD.

In step 408, each WCD receives the transition message and in response to the transition message, determines whether to send an acknowledgement message in response to the receipt of the transition message or to send an identification code to the other WCD, as shown in step 410. In one embodiment, this decision is based on whether the WCD initiated the initial communication or not. If it did initiate the present communication (the first WCD in this example), an acknowledgement message is sent from the first WCD to the second WCD, as shown in step 410, acknowledging receipt of the transition message. In step 412, the first countdown timer is canceled within the first WCD because it is no longer necessary to determine if a response from the second WCD has been received, due to receipt of either the transition message or an identification code sent by the second WCD (explained later). In step 414, a second coutdown timer is started to determine if the second WCD responds to the acknowledgement message within a predetermined time period.

Back in step 408, if the WCD determines that it did not initiate the present communication (the second WCD, in this example), it sends an identification code to the first WCD to enable the first WCD to establish a second communication using the second service option in conjunction with the identification code, as shown in step 416. In one embodiment, the identification code comprises a telephone number associated with the WCD for use only in a particular service option. For example, each WCD may have one unique telephone number assigned to it for every service option offered by the service provider. In this case, the WCD transmitting the identification code would transmit the telephone number associated with the service option identified in the transition message. In step 420, the first countdown timer in the second WCD is canceled. In step 422, an optional third countdown timer is started within the second WCD for determining if the first WCD responds within a predetermined amount of time after transmission of the identification code.

In step 424, the first WCD receives the identification code. In step 426, the second countdown timer located within the first WCD is canceled, due to receipt of identification code. In step 428, an optional second acknowledgement message is transmitted to the second WCD to acknowledge receipt of the identification code. In step 430, the second acknowledgment message is received by the second WCD, and the third countdown timer is canceled within the second WCD in step 432.

In step 434, the first WCD now begins the process of transitioning the communication from the first service option to the second service option by using methods that are well known in the art. For example, a termination message is transmitted to the infrastructure (i.e. base station 106, BSC 112, etc.), which terminates the present communication using the first service option. A termination notification is transmitted to the second WCD by the infrastructure. Next, in step 436, a second communication using the second service option is initiated by the first WCD transmitting an origination message requesting a communication to the second WCD using the second service option. Optionally, the origination message comprises the identification code transmitted by the first WCD. The infrastructure processes the communication as usual, allocating infrastructure resources to handle the communication using the second service option, locating the second WCD in the wireless system (or outside the wireless system), and sending a page message alerting the second WCD to the presence of the second communication.

In step 438, the communication using the second service option is established by the second WCD responding to the page message and accepting the communication, as is well-known in the art.

In one embodiment, the second WCD may only accept the second communication if it originates from the first WCD.

In this embodiment, an identification code corresponding to the first WCD is transmitted to the second WCD prior to termination of the first communication. This identification code may identify the first WCD in the second service option only, or it may represent a single identification code assigned to the first WCD. The received identification code is stored in memory 206.

In either case, when the first communication is terminated, a fourth countdown timer within the second WCD is started. The fourth countdown timer is used to establish a time window in which calls from WCDs other than the first WCD will not be accepted. The idea is to allow the transition to occur without interruption from other WCDs.

An identification code identifying the first WCD may be provided in the page message to the second WCD during initialization of the second communication. When the page message is received by the second WCD, the originator of the communication is identified using well-known techniques similar to Caller ID. Prior to accepting the second communication, the second WCD compares the identification code contained within the page message to the identification code stored in memory 206 from the first WCD during the first communication. If the identification codes match, the second communication is accepted. If the identification codes do not match, and the fourth countdown timer has not expired, the call is rejected. If the fourth countdown timer has expired, the call is accepted whether or not the identification codes match one another.

In certain instances, the first WCD may already know the identification code of the second WCD used for communications involving the second service option. For example, the first WCD may be provisioned with a number of identification codes corresponding to one or more WCDs, each WCD having an identification code corresponding to a specific service option type. In this situation, the identification code corresponding to the second service option may not need to be transmitted during a service option transition.

Figure 5:
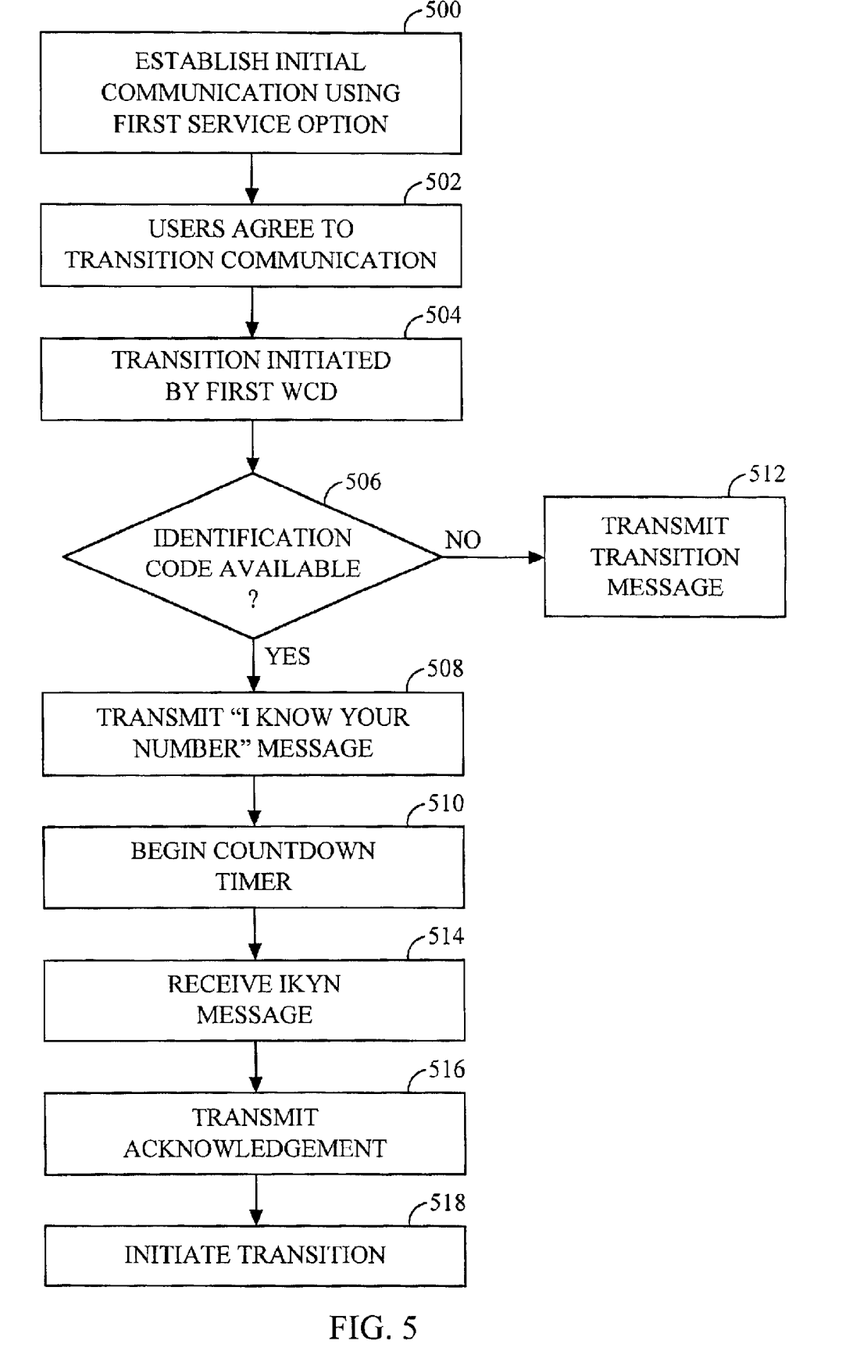
FIG. 5 is a flow diagram illustrating a method of facilitating a transparent service option when an identification code corresponding to another wireless communication device is known.

FIG. 5 is a flow diagram illustrating this point. In step 500, a communication between a first WCD and a second WCD using a first service option is initiated, the first WCD having initiated the communication, in this example. In addition, the first service option comprises a voice service option, although it should be understood that the first service option could alternatively comprise a synchronous data service option, an asynchronous data service option, or some other service option offered by a wireless service provider.

In step 502 the users of the first and second WCDs agree to transition the communication to a second service option, in this example, a secure data communication using an asynchronous data service option offered by the wireless service provider. In step 504, one of the users initiates the transition, generally by pressing a key located on a respective WCD. In this example, the first WCD initiates the transition.

In step 506, the first WCD determines if an identification code corresponding to the second WCD during the second service option is available. Availability is determined generally by the first WCD checking memory 206 within the first WCD. If the identification code is available, then the first WCD transmits an "I Know Your Number" (IKYN) message to the second WCD in step 508. An optional countdown timer is started, as shown in step 510, upon transmission of the IKYN message. If, in step 506, the identification code is available to the first WCD, a transition message is sent, asking the second WCD to send its identification code for use in the second service option.

In step 514, the second WCD receives the IKYN message. In response, the second WCD transmits an acknowledgement message back to the first WCD, acknowledging receipt of the IKYN message, as shown in step 516. The second WCD does not transmit its identification code corresponding to the second service option because the IKYN message indicates that the first WCD already knows what that identification code is.

In step 518, the first WCD now begins the process of transitioning the communication from the first service option to the second service option, as explained above. The optional countdown timer is cleared in this step as well.

Figure 6:
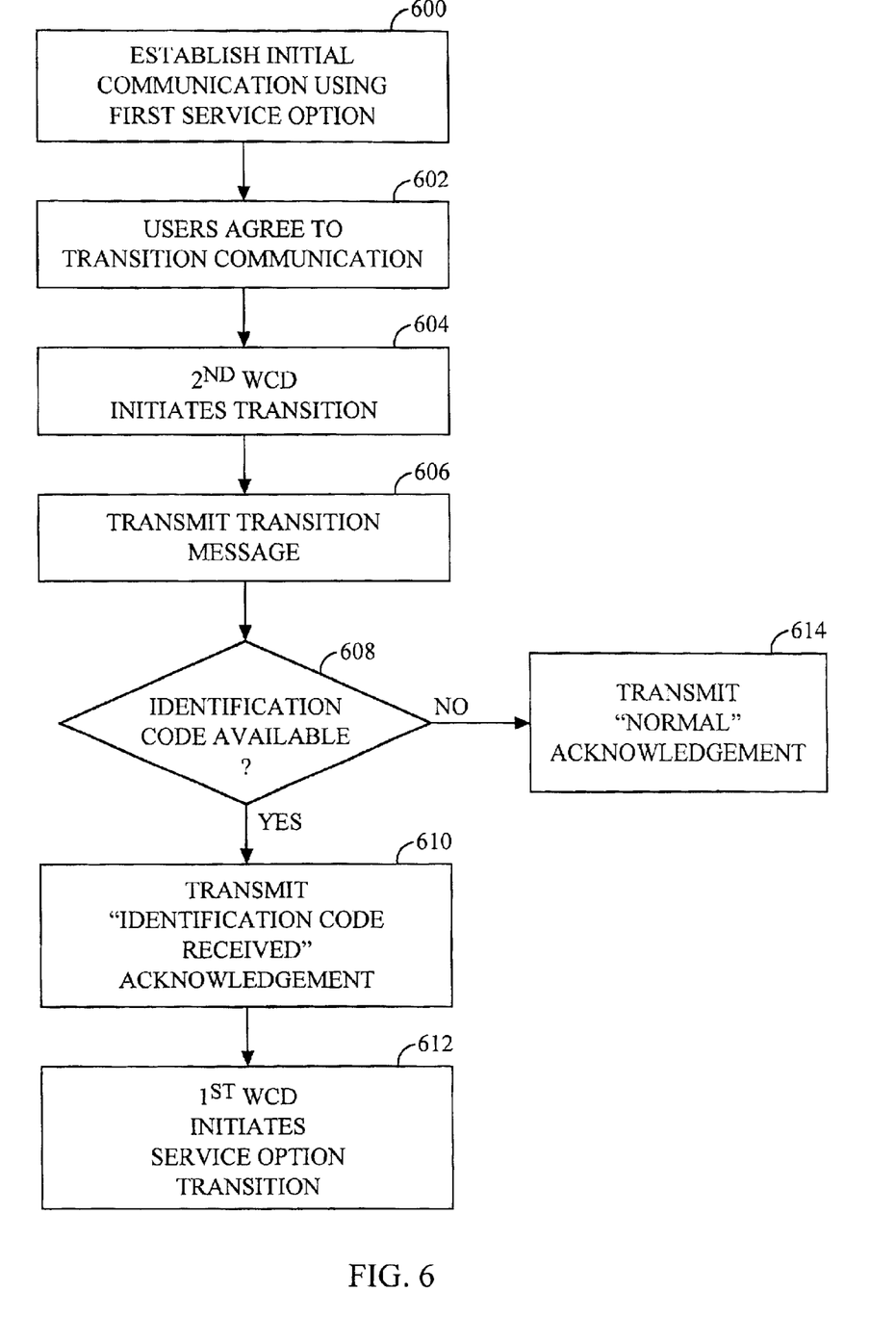
FIG. 6 is a flow diagram illustrating an alternative method of facilitating a transparent service option when an identification code corresponding to another wireless communication device is known.

FIG. 6 is a flow diagram illustrating an IKYN service option transition when requested by the second WCD, i.e., the WCD that was called by the WCD that initiated the first communication. In step 600, a communication between a first WCD and a second WCD using a first service option is initiated, the first WCD having initiated the communication.

In step 602, a decision to transition the communication to a second service option is made, either jointly by both users or unilaterally by either user. As in this and all examples contained herein, the transition may also be initiated automatically as soon as the initial communication is established.

In step 604, the user of the second WCD initiates the transition, generally by pressing a key located on his or her respective WCD.

In step 606, the second WCD transmits a transition message to the first WCD. The transition message informs the first WCD that a service transition is desired. In one embodiment, the transition message comprises information identifying the preferred service option to transition to, for example, an asynchronous data service option. In another embodiment, the first WCD selects a pre-determined default service option to transition to.

In step 608, the first WCD determines if an identification code corresponding to the second WCD during the second service option is available. Availability is determined generally by the first WCD checking memory 206 within the first WCD. If the identification code is available, then the first WCD simply transmits an "identification code received" type of acknowledgement message to the second WCD in step 610, informing the second WCD that the second WCD's identification code does not need to be transmitted. The second WCD, therefore, does not transmit its identification code upon receipt of the acknowledgement message. In step 608, if no identification code is available, the first WCD sends an acknowledgement message which queues the second WCD to transmit its identification code in step 614.

In step 612, the first WCD now begins the process of transitioning the communication from the first service option to the second service option, as explained above.

Using the above described methods for facilitating a transparent service option transition, a potential problem may occur if a three-way communication is established. In this scenario, a first WCD contacts a second WCD using a first service option, for example, a voice service option. The first WCD then contacts a third WCD using the same service option to establish a three-way call. The first WCD is then removed from the three-way communication (i.e., voluntarily discontinuing the communication or by being dropped from the communication due to any number of reasons, such as leaving an area of wireless coverage), leaving only the second WCD and the third WCD involved in the communication. In this scenario, both the second WCD and the third WCD have been contacted by another WCD to establish the communication (the second WCD has both been contacted and has initiated a communication). Therefore, both WCDs believe they did not initiate the initial communication using the first service option.

In another related situation, both WCDs may believe that they were the party initiating the first communication using a first service option. In this case, a first WCD contacts a second WCD. Next, a third WCD contacts the second WCD, and the three WCDs are involved in a three-way communication. If the second WCD is removed from the communication leaving only the first WCD and the third WCD, each of the remaining WCDs believe that they are the WCD who initiated the communication.

If a service option transition is now desired between the remaining WCDs, problems will occur with the transition. In the first situation (both WCDs believe that they did not initiate the initial communication), neither WCD will initiate the second communication under the above described transition methods. In the second situation (both WCDS believe that they initiated the initial communication), both WCDs will try to initiate the second communication. In either case, the service option transition will fail.

Figure 7:
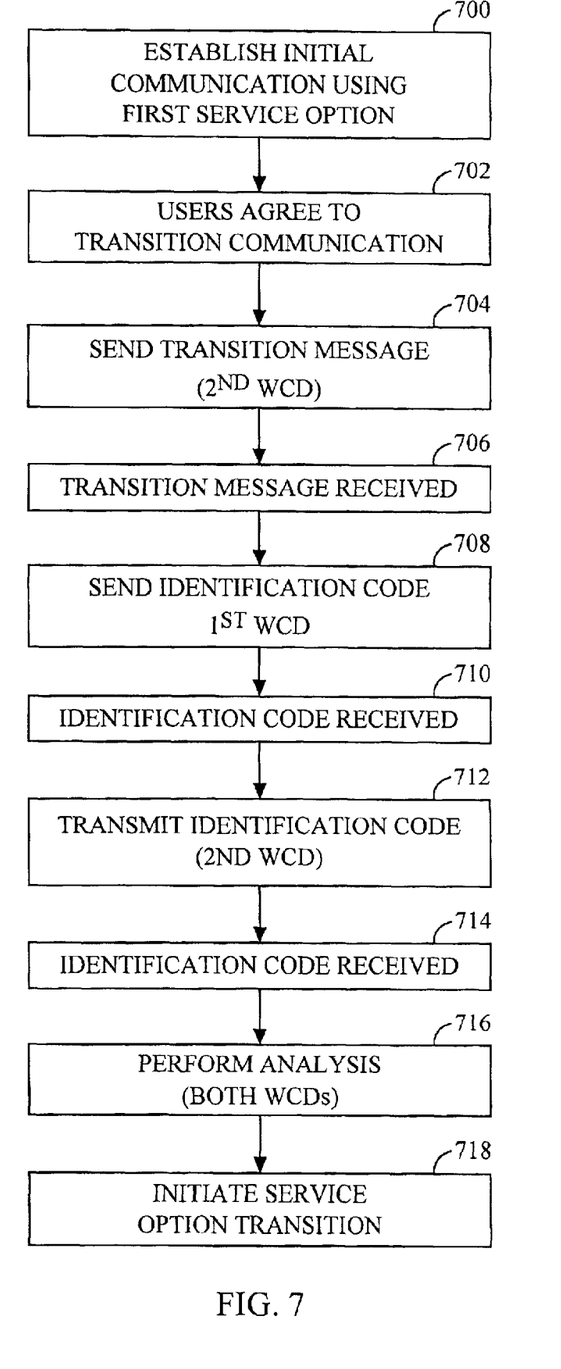
FIG. 7 is a flow diagram illustrating one embodiment of the present invention for successfully transitioning a communication from a first service option to a second service option when two wireless communication devices each believe that they did not initiate the initial communication.

FIG. 7 is a flow diagram illustrating one embodiment of the present invention for successfully transitioning a communication from a first service option to a second service option when both WCDs believe that they did not initiate the initial communication.

In step 700, a first WCD and a second WCD are already engaged in an initial communication using a first service option. Both WCDs believe that they did not initiate the initial communication, as described above. In step 702, both users of the WCDs decide to transition the communication to a second service option.

In this example, the second WCD initiates the service option transition by sending a transition message to the first WCD, as shown in step 704. The transition message is received by the first WCD in step 706, and in step 708, the first WCD sends an identification code corresponding to the first WCD. In one embodiment, the identification code corresponds to the first WCD when used in a second service option.

In step 710, the second WCD receives the identification code transmitted by the first WCD. The receipt of the identification code is an unexpected condition for the second WCD. Therefore, upon receipt of the identification code, the second WCD transmits its own identification code to the first WCD in step 712.

In step 714, the first WCD receives the identification code from the second WCD. Again, this is an unexpected reception for the first WCD.

In step 716, both WCDs perform an analysis to determine which WCD should initiate the service option transition (i.e., terminate the first communication and initiate a second communication using the second service option). In one embodiment, each WCD compares its own identification code to the identification code received from the other WCD. In this embodiment, the WCD which has the lower identification code (or higher, in an alternative embodiment) assumes the responsibility of initiating the transition. For example, if the identification code associated with the first WCD is 858-651-2356 and the second identification code is 858-223-5584, the codes are converted to decimal and then compared to each other. In this case, the second WCD would initiate the service option transfer, because 8,582,235,584 is less than 8,586,512,356. Of course other manipulations of the identification codes could be used in the alternative to select the initiating WCD. For example, the identification codes could be converted into decimal and the divided by each other. If the result is greater than 1, then a predetermined WCD would initiate the service option transition. Many other techniques could be used in the alternative.

Other techniques may be used in the alternative to comparing identification codes. For example, a GPS position indication of each WCD could be transmitted to each other for comparison. Alternatively, a random number could be generated at each WCD, transmitted to the other WCD, and compared.

In any case, in step 716, one of the WCDs is chosen to initiate the second communication. In step 718, the chosen WCD now begins the process of transitioning the communication from the first service option to the second service option, as explained above.

Figure 8:
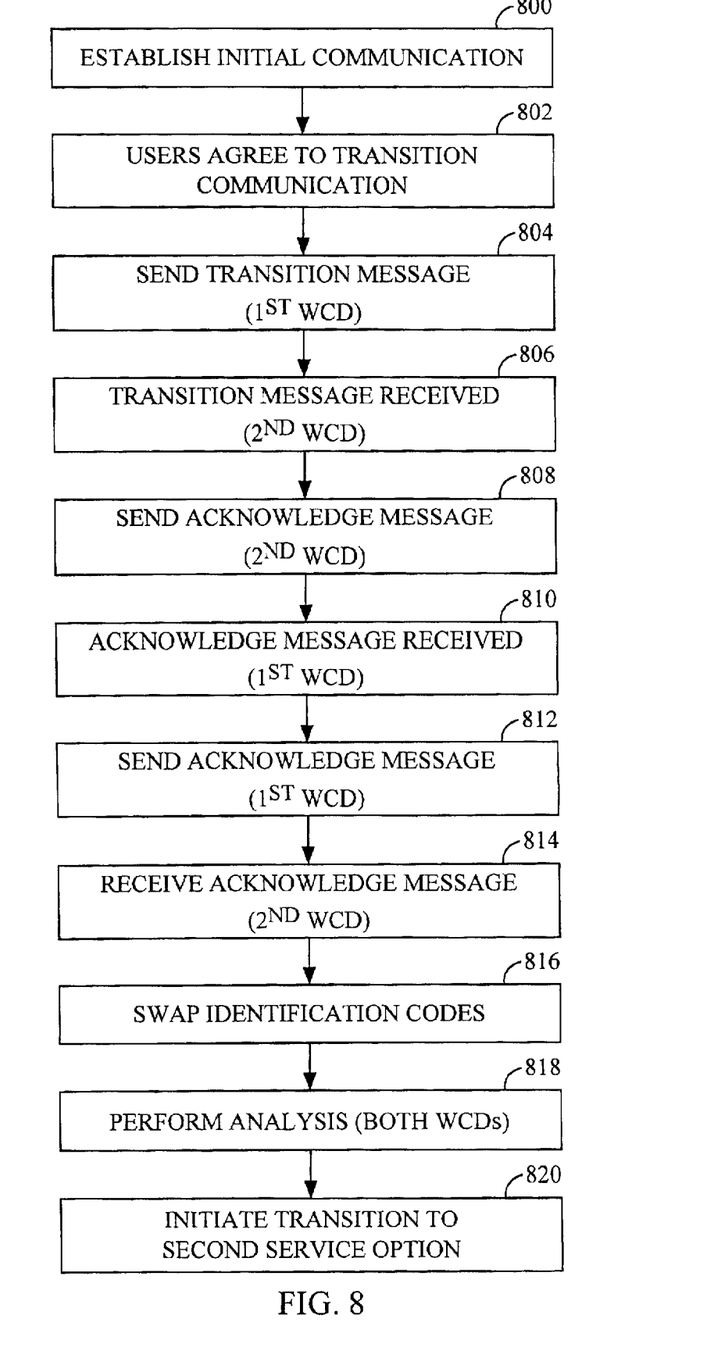
FIG. 8 is a flow diagram illustrating one embodiment of the present invention for successfully transitioning a communication from a first service option to a second service option when two wireless communication devices both believe that they initiated the initial communication.

FIG. 8 is a flow diagram illustrating one embodiment of the present invention for successfully transitioning a communication from a first service option to a second service option when both WCDs believe that they initiated the initial communication, as described above.

In step 800, a first WCD and a second WCD are already engaged in an initial communication using a first service option. Both WCDs believe that they initiated the initial communication, as described above. In step 802, one or both users of the WCDs decide to transition the communication to a second service option.

In this example, the first WCD initiates the service option transition by sending a transition message to the second WCD, as shown in step 804. The transition message is received by the second WCD in step 806, and in step 808, the second WCD sends an acknowledgement message to the first WCD thinking that it was the WCD that initiated the first communication.

In step 810, the acknowledgement message is received by the first WCD. This is an unexpected result which is a signal to the first WCD that both WCDs believe they were the one to initiate the initial communication. In response, then, the first WCD sends an acknowledgement message back to the second WCD in step 812.

In step 814, the acknowledgement message from the first WCD is received by the second WCD. The receipt of the acknowledgement message is an indication to the second WCD that both WCDs believe they were the one to initiate the initial communication.

In step 816, both WCDs exchange their respective identification codes. In step 818, both WCDs perform an analysis to determine which WCD should initiate the service option transition, as explained above with respect to FIG. 7. In step 820, the chosen WCD now begins the process of transitioning the communication from the first service option to the second service option, as explained above.

The preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

We claim:

1. An apparatus for facilitating a transparent service option transition between a first communication device and a second communication device, comprising:

said first communication device, comprising:

a processor for establishing a first communication with said second communication device using a first service option, said second communication device identified by a first identification code;

a storage device for storing a second identification code also corresponding to said second communication device; and said processor further for terminating said first communication and for automatically initiating said second communication with said second communication device using said second identification code, said second communication using a second service option.

2. The apparatus of claim 1 wherein said identification code comprises an alpha-numeric code associated with said first communication device for use in communications using said second service option.

3. The apparatus of claim 1 wherein said second communication is initiated within a predetermined time period.

4. The apparatus of claim 1 further comprising:

a receiver for receiving said second identification code during said first communication;

said processor further for storing said second identification code in said storage device.

5. The apparatus of claim 4 further comprising a DTMF demodulator for demodulating said second identification code.

6. The apparatus of claim 1 further comprising:

a countdown timer for determining the time between terminating said first communication and the initiating of said second communication;

wherein a communication from a third communication device is rejected if said countdown timer has not expired.

7. A method for facilitating a transparent service option transition between a first communication device and a second communication device, comprising:

establishing a first communication with said second communication device using a first service option;

transmitting a request to transition said first communication to a second communication using a second service option; and transitioning said first communication to said second communication, wherein said transitioning comprises:

retrieving an identification code corresponding to said second communication device from a storage device located within said first communication device;

terminating said first communication; and initiating said second communication using said identification code to identify said second communication device.

8. The method of claim 7 wherein said initiating said second communication comprises establishing said second communication within a predetermined period from the time said first communication was terminated.

9. The method of claim 7 wherein said retrieving said identification code further comprises:

receiving said identification code from said second communication device; and storing said identification code in a storage device within said first communication device.

10. The method of claim 9 further comprising using DTMF demodulation to demodulate said identification code prior to said storing said identification code in said storage device.

* * * * *